US006454020B1

(12) United States Patent
Jong

(10) Patent No.: US 6,454,020 B1
(45) Date of Patent: Sep. 24, 2002

(54) LOCKING DEVICE FOR OUTPUT SHAFT OF ELECTRIC TOOLS

(75) Inventor: Jung-Chang Jong, Chungli (TW)

(73) Assignee: Jenn Feng Industrial Co., Ltd., Ping-Chang (TW)

( * ) Notice: Subject to any disclaimer, the term of this patent is extended or adjusted under 35 U.S.C. 154(b) by 0 days.

(21) Appl. No.: 10/058,019

(22) Filed: Jan. 29, 2002

(51) Int. Cl.[7] .................................................. B23Q 5/00

(52) U.S. Cl. ......................... 173/93; 173/93.5; 173/176; 173/104; 173/213; 173/217

(58) Field of Search .......................... 173/93, 93.5, 217, 173/216, 213, 176, 104, 47

(56) References Cited

U.S. PATENT DOCUMENTS 4,076,449 A * 2/1978 Theis, Jr. et al. ........... 173/177
4,947,939 A * 8/1990 Hung .......................... 173/93
5,887,666 A * 3/1999 Chen et al. ................ 173/93.5
5,915,484 A * 6/1999 Hsieh ......................... 173/176
6,209,658 B1 * 4/2001 Yoon ........................... 173/93
6,230,819 B1 * 5/2001 Chen ........................... 173/48
6,311,787 B1 * 11/2001 Berry et al. ................ 173/216

* cited by examiner

*Primary Examiner*—Scott A. Smith
(74) *Attorney, Agent, or Firm*—Bacon & Thomas, PLLC

(57) ABSTRACT

A locking device for output shaft of electric tools includes a plurality of brake pads arranged as a circle in a passage in a casing and the brake pads can be limited by a driving disk to co-rotate with a cam mounted on an output shaft. When the output shaft is rotated manually, the brake pads are pushed by the cam and contact the inside of the passage so as to secure the output shaft to output a torque. The driving disk has a hole wherein two hill portions extend from two opposite sides of the hole. The output shaft extends through the hole. A cover plate is mounted to the driving disk and has an aperture whose two opposite sides are located alignment with the two opposite sides of the hole in the driving disk. The driving disk has pawls on a surface thereof and limit the brake pads not to contact the inside of the passage.

3 Claims, 7 Drawing Sheets

LOCKING DEVICE FOR OUTPUT SHAFT OF ELECTRIC TOOLS

FIELD OF THE INVENTION

The present invention relates to a locking device for securing the output shaft of an electric tool when the shaft is used manually with electric power.

BACKGROUND OF THE INVENTION

A conventional electric tool is generally driven by electric power which can be a rechargeable pack or a power supply coming from the wall. An active gear connected to the driving shaft of motor is engaged with a gear set which is then engaged with a passive gear connected to the output shaft. When the electric power is out, the user may use the output shaft manually and the passive gear is used as an active gear to drive the driving shaft of the motor. This causes the drill spins together with the operation and cannot output a torque to unscrew a screw or bolt. Some manufacturers develop a locking device for secure the output shaft during manual operation so that the output shaft can output a torque. The locking device includes several brake pads each having a longitudinal protrusion and a radial protrusion. These brake pads are supposed to contact an inside of a casing in which the output shaft is located. A cam is mounted to the output shaft and rotated with the output shaft. A driving disk is connected to the gear set and includes several fan-shaped bosses which are respectively located between the brake pads. When the driving disk is rotated, the bosses shift the longitudinal protrusions to release the brake status of the brake pads so that the output shaft, the cam and the brake pads are co-rotated. When the driving disk stops, and the output shaft is rotated in opposite direction, the cam pushes the brake pads to contact the inside of the casing to secure the output shaft. However, the longitudinal protrusions of the brake pads could separate from the driving disk when-the driving disk reduces its speed. The brake pads will impact the inside of the casing and generate noise.

SUMMARY OF THE INVENTION

In accordance with one aspect of the present invention, there is provided a locking device for output shaft of electric tools and the device includes a casing having a passage through which a shaft extends. The shaft has a polygonal distal end on which a cam is mounted. The cam has a plurality of protrusions and recesses are defined between the protrusions. A plurality of brake pads each have two blocks and are located in the passage of the casing. A driving disk has a plurality of pawls on a first surface thereof and a width of each of the pawls is less than a distance between two blocks of each of the brake pads. A hole is defined through the driving disk and the distal end of the output shaft is engaged with the hole of the driving disk. Two opposite sides of the hole of the driving disk have a hill portion at an intermediate portion thereof. A plurality of concavities are defined in a second surface of the driving disk and each of which receives a spring a ball therein. A cover plate is mounted to the second surface of the driving disk and a plurality of holes are defined through the cover plate. The number of the holes in the cover plate are two times of the number of the concavities in the driving disk. The balls are engaged with half number of the holes. The cover plate has an aperture and two opposite sides of the aperture are in alignment with two opposite sides of the hole in the driving disk.

The primary object of the present invention is to provide a locking device wherein the swing of the brake pads are limited when the rotation of speed of the driving disk is reduced so that the brake pads will not impact the inside of the passage of the casing.

The present invention will become more obvious from the following description when taken in connection with the accompanying drawings which show, for purposes of illustration only, a preferred embodiment in accordance with the present invention.

DETAILED DESCRIPTION OF THE INVENTION

Figure 1:
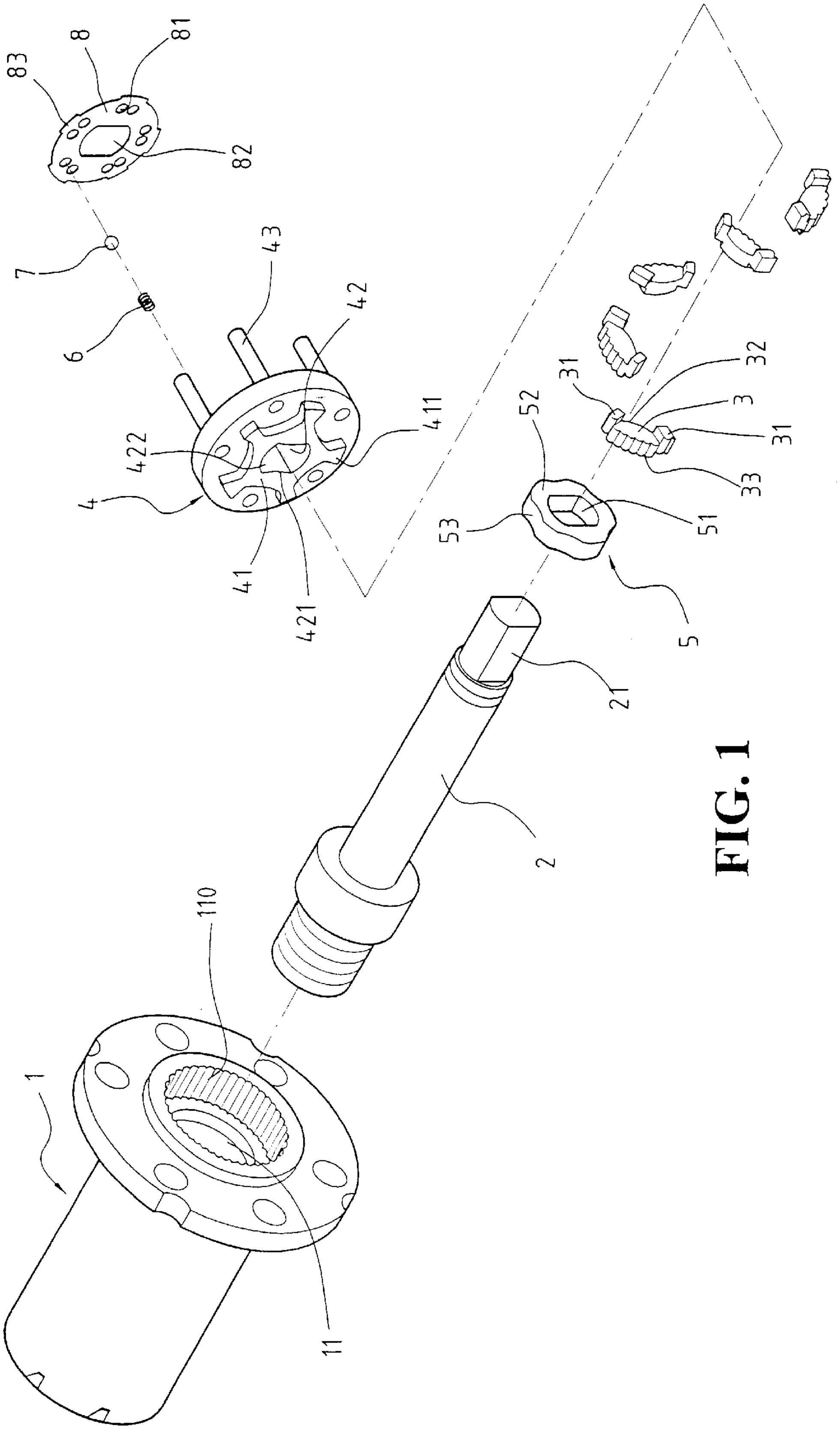
FIG. 1 is an exploded view to show the locking device of the present invention.

Referring to FIGS. 1 to 4, the locking device for an electric tool of the present invention comprises a casing 1 which is connected to a barrel of the tool which is not shown, and a passage 11 is defined through the casing 1. A knurl surface 110 is defined in an inside of the passage 11. An output shaft 2 with a bearing is received in the passage 11 and includes a distal end 21 which includes two surfaces defined in two sides thereof. A cam 5 has a hole 51 in which the distal end 21 is engaged and the cam 5 includes protrusions 52 and recesses 53 defined between the protrusions 52. Five brake pads 3 are arranged as a circle and received in the passage 11. Each of the brake pad 5 has two blocks 32 on two ends thereof and a knurl surface 33 is defined in an outside of each of the brake pads 3. The brake pads 3 are respectively located in the recesses 53 of the cam 5 of the output shaft 2.

Figure 6:
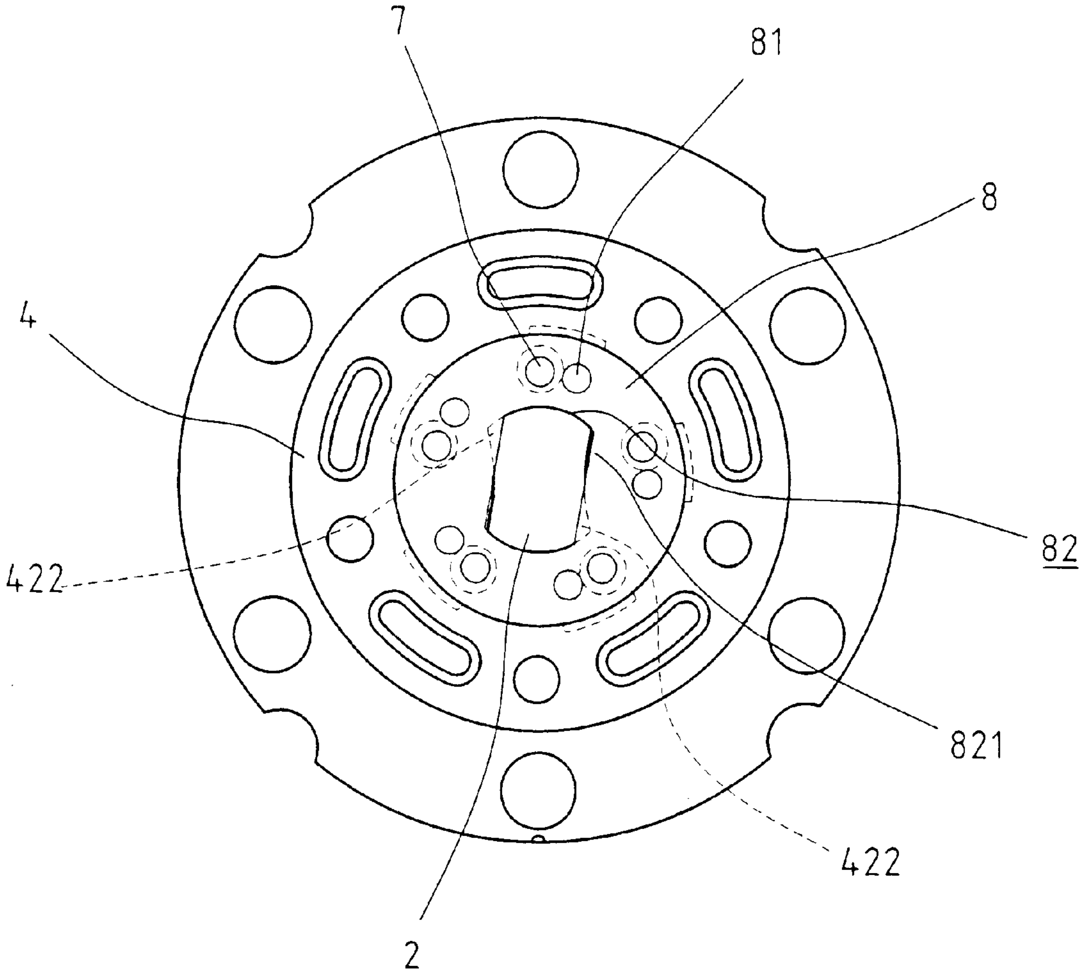
FIG. 6 is a plan view to show the locking device when the shaft is driven counter clockwise by the driving disk.

A driving disk 4 for driving the output shaft 2 includes a hole 42 through which the distal end 21 of the shaft 2 extends. Two opposite sides of the hole 42 each have a hill portion 421 on the intermediate portion thereof so that two fan-shaped spaces 422 are defined at two sides of the hill portion 421. A raised portion 41 extends from a first surface of the driving disk 4 and a plurality of pawls 411 extend from the raised portion 41. The width of each of the pawls 411 is less than the distance between two blocks 31 of each of the brake pads 3. A plurality of rods 43 extend from a second surface of the driving disk 4 and pinions (not shown) are respectively mounted on the rods 43 so that the driving disk 4 can be rotated by a gear set (not shown). A plurality of concavities 44 are defined in the second surface of the driving disk 4 and each concavity 44 has a spring 6 a ball 7 received therein. A cover plate 8 is mounted to the second surface of the driving disk 4 and a plurality of holes 81 are defined through the cover plate 8. The number of the holes 81 is two times of the number of the concavities 44. The balls 7 are urged by the corresponding springs 6 and engaged with the holes 81 so that the cover plate 8 cannot rotated relative to the driving disk 4. The cover plate 8 has an aperture 82 and two opposite sides 821 of the aperture 82 are located in alignment with the two parallel sides of two fan-shaped spaces 422 on different sides as shown in FIG. 6. The two respective sides of other two fan-shaped spaces 422 of the hole 42 are not located in alignment with the other two sides of the aperture 82.

Figure 2:
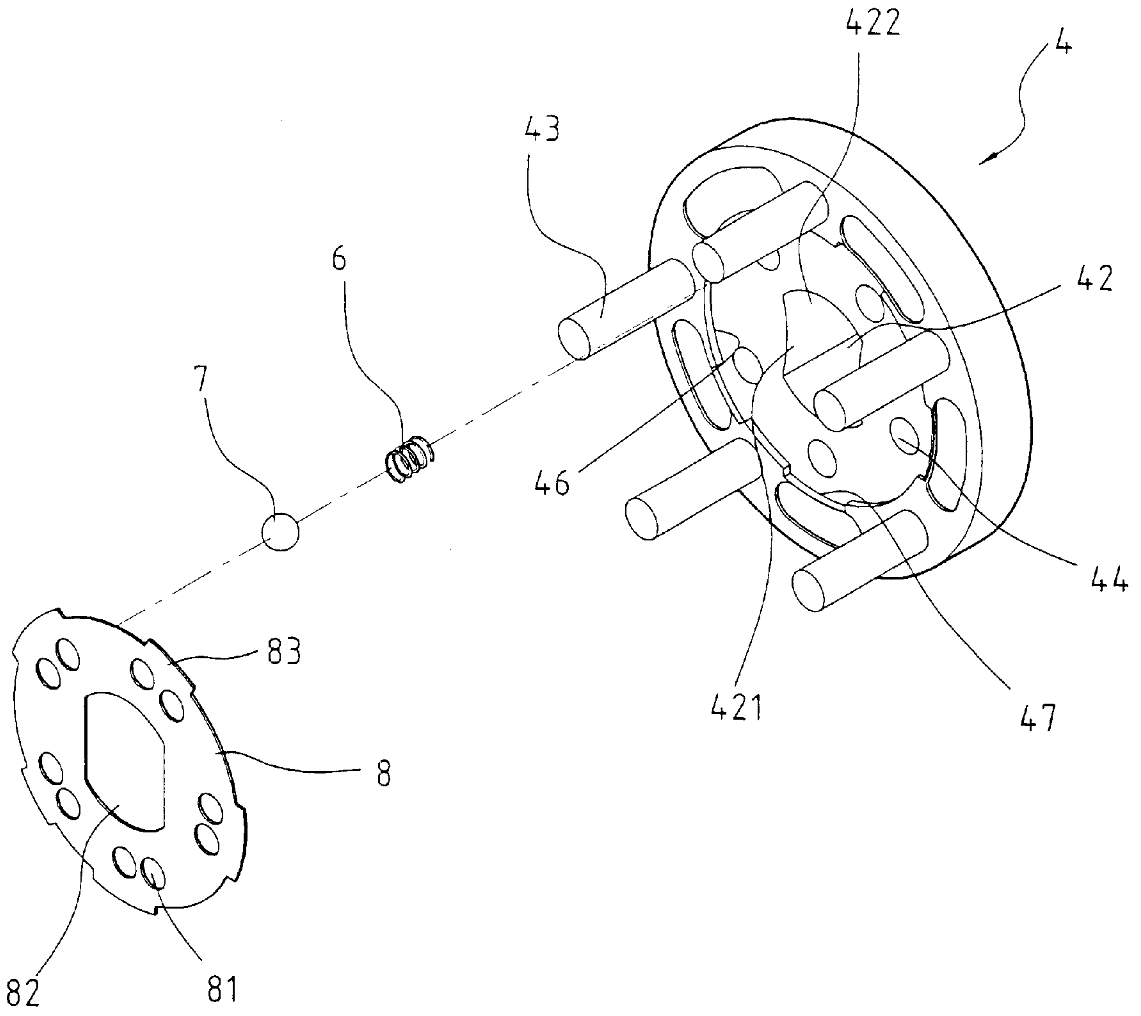
FIG. 2 is an exploded view to show the driving disk and a cover plate of the locking device of the present invention.

As shown in FIG. 2, a plurality of recesses 46 are defined in the second surface of the driving disk 4 and each recess 46 communicates with a notch 47 located adjacent to the recess 46. A plurality of flanges 83 extending from the cover plate 8 and may insert through the notches 47 when connecting the cover plate 8 to the driving disk 4, and the flanges 83 are then slid into the recesses 46. This allows the cover plate 8 to be rotatable relative the driving disk 4 but will not disengaged from the driving disk 4.

Figure 3:
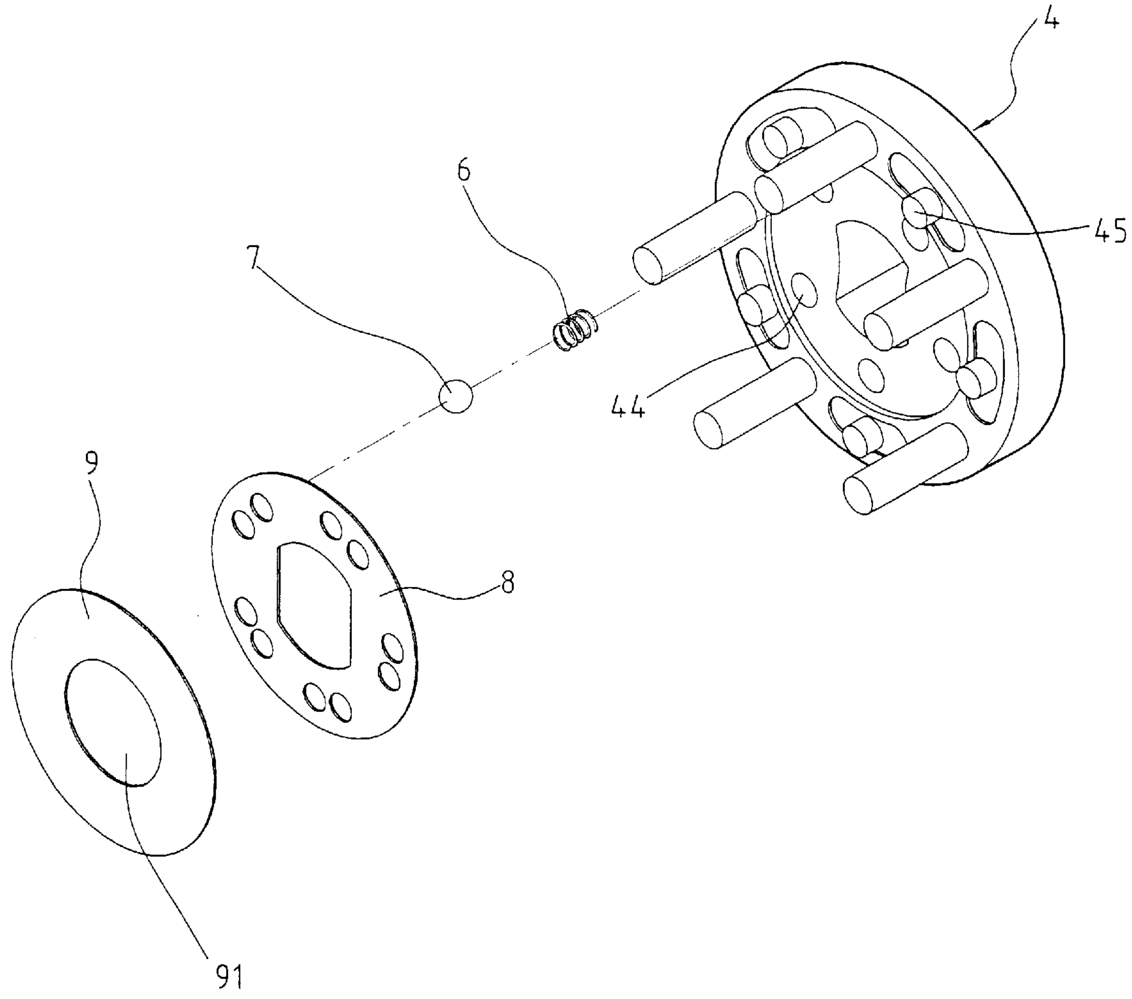
FIG. 3 is an exploded view to show another embodiment of the driving disk and a cover plate of the locking device of the present invention.
Figure 4:
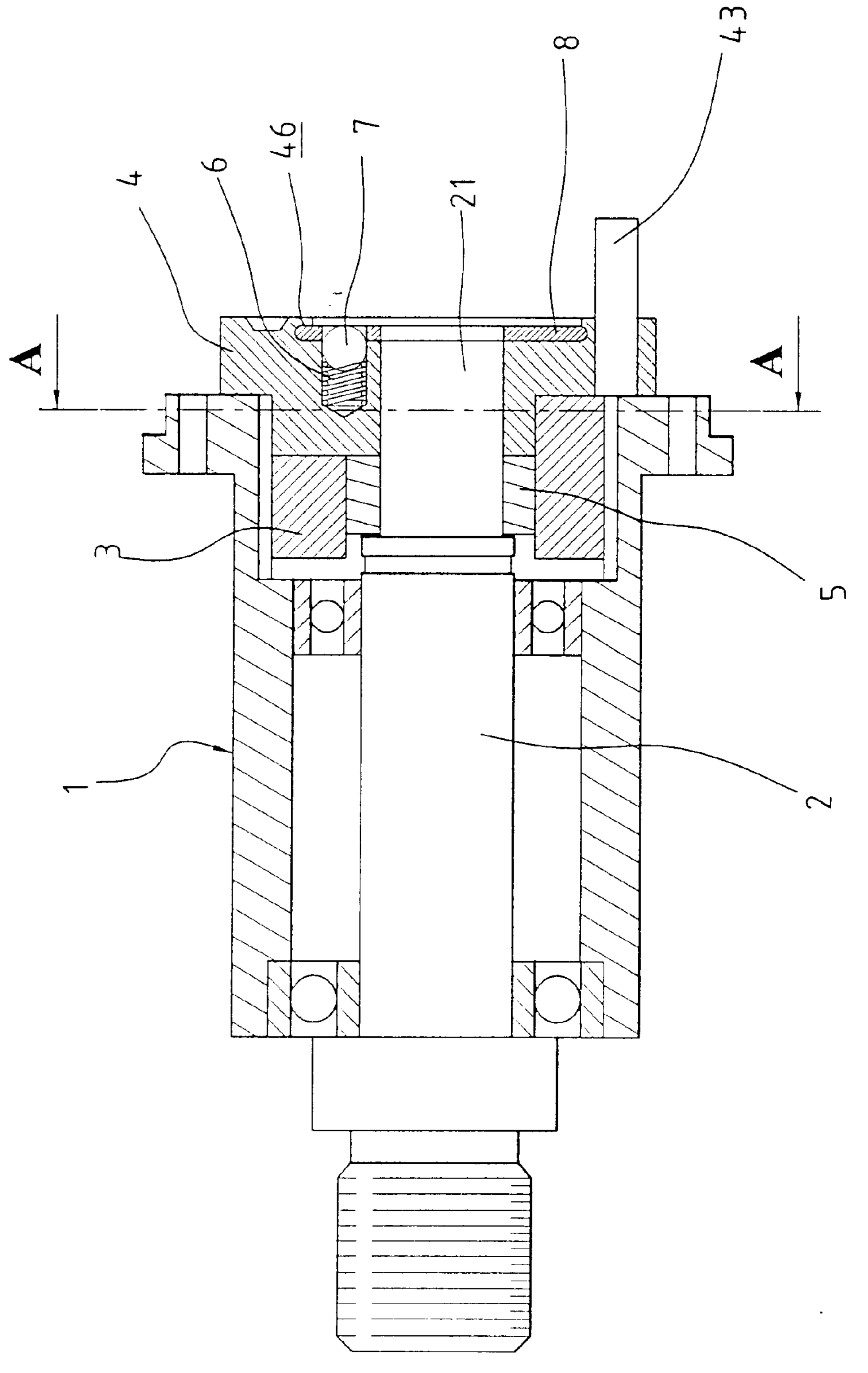
FIG. 4 is a cross sectional view to show the locking device of the present invention.
Figure 5:
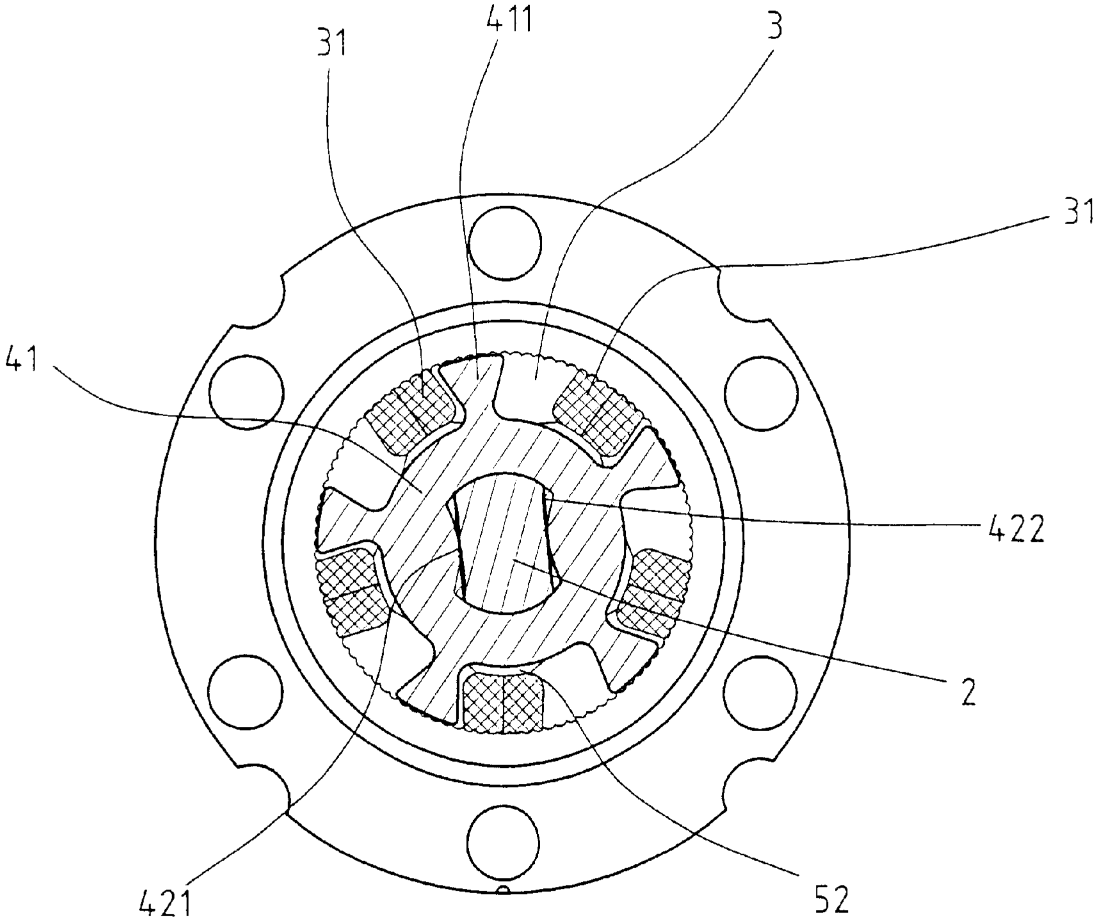
FIG. 5 is a cross sectional view seen from the cutting line A—A.

FIG. 3 shows the other way that the driving disk 4 is engaged with the cover plate 8. A pressing plate 9 having a circular hole 91 is matched with the cover plate 8. The driving disk 4 has stubs 45 which extend through holes in the cover plate 8 and then are pressed to be flat to press on a periphery of the pressing plate 9 and secure the cover plate 8 and the pressing plate 9 to the driving disk 4.

The pawls 411 are arranged between the two blocks 31 of the brake pads 3 and the angle that the distal end 21 of the output shaft 2 can swing in the two fan-shaped spaces 422 is larger than the angle that the pawls 411 swing between the two blocks 31, such that the two ends of the pawls 411 contact the blocks 31 when the driving disk 4 is rotated clockwise or counter clockwise.

The motor of the tool drives the gear set which drives the driving disk 4 The pawls 411 contact the blocks 31 on one end of the brake pads 3 and restrain the swing of the brake pads 3. Therefore, the outer surface of the brake pads 3 will not contact the inside of the passage 11 so that the output shaft 2, the cam 5 and the brake pads 5 can be rotated by the driving disk 4.

When no electric power is supplied, an torque is applied to the output shaft 2, the distal end 21 drives the cam 5 and the protrusions 52 push protrusion on the inner surface 32 of the brake pads 3 and the knurl surface 33 of the brake pads 3 contact the knurl surface 110 in the passage 11 so as to secure the output shaft 2 which is not driven by the driving disk 4. Therefore the output shaft 2 can be operated manually to output a torque.

In order to avoid the impact between the brake pads 3 and the inside of the passage 11 when the speed of the driving disk 4 is reduced to cause the distal end 21 of the output shaft 2 to swing within the fan-shaped spaces 422 and the brake pads 3 to swing due to initial movement, the cover plate 8 provides a correction function. The aperture 82 of the cover plate 8 is completely matched with the distal end 21 of the output shaft 2 so that the distal end 21 of the output shaft 2 does not have any room to move in the fan-shaped spaces 422 during the rotation of the output shaft 2. When the speed of the driving disk 4 is reduced, the output shaft 2 does not move in the fan-shaped spaces 422 and the brake pads 3 stop swinging so that the no noise is generated and the output shaft 2 is rotated smoothly without the interruption of the brake pads 3.

Figure 7:
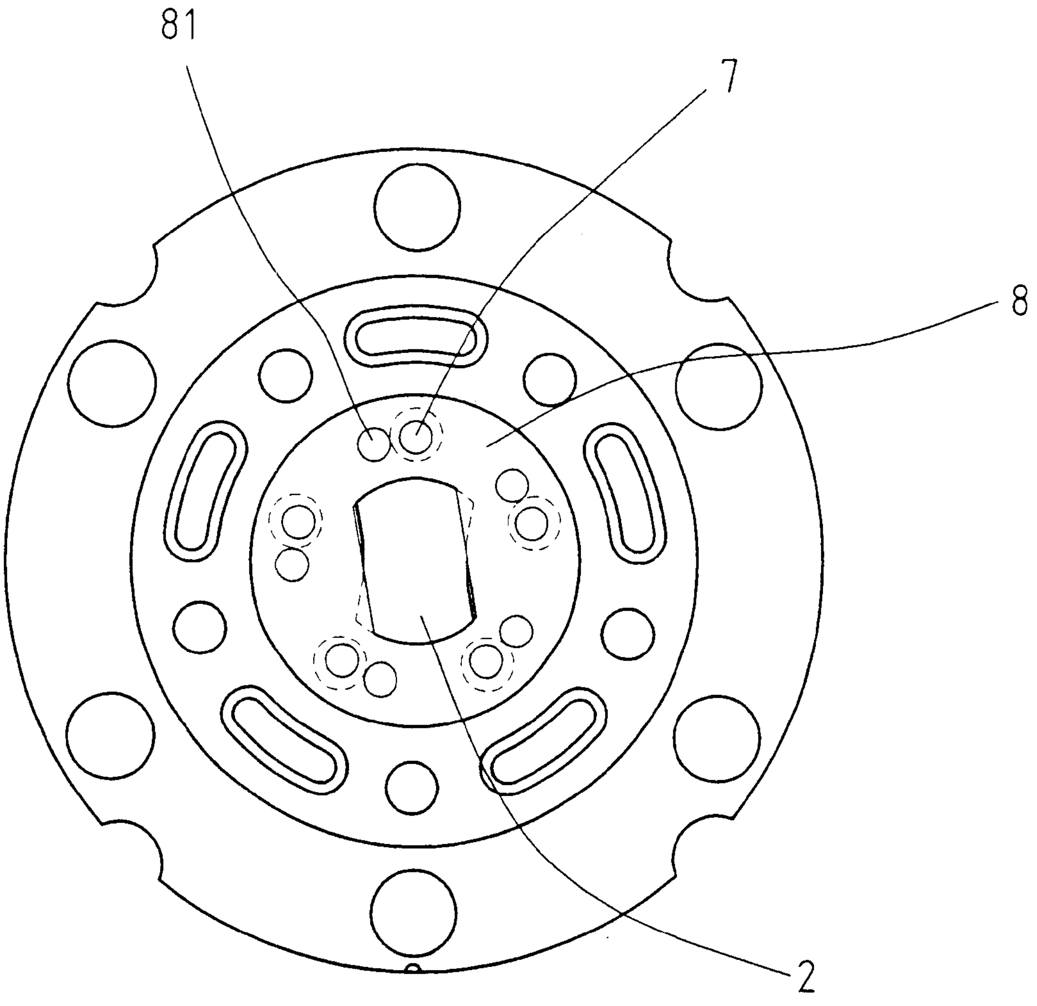
FIG. 7 is a plan view to show the locking device when the shaft is driven clockwise by the driving disk.

FIG. 6 shows that when the driving disk 4 rotates counter clockwise, the balls 7 are engaged with the holes 81 on the left side of the cover plate 8. The two sides of the distal end 21 contact the two sides of the two fan-shaped spaces 422 on opposite sides, so that the output shaft 2 can be rotated counter clockwise by the driving disk 4. When the output shaft 2 is to be rotated clockwise, the user holds the knob (not shown) on the driving disk 4 and rotates the driving disk 4 clockwise till the balls 7 are engaged with the holes 81 on the right side as shown in FIG. 7. The driving disk 4 can be rotated and drives the output shaft 2 clockwise without any noise.

While we have shown and described the embodiment in accordance with the present invention, it should be clear to those skilled in the art that further embodiments may be made without departing from the scope of the present invention.

What is claimed is:

1. A locking device for output shaft of electric tools, comprising:

a casing having a passage;

a shaft rotatably received in the passage and having a polygonal distal end;

a cam mounted to the output shaft and co-rotated with the output shaft, the cam having a plurality of protrusions and recesses defined between the protrusions;

a plurality of brake pads each having two blocks and a protrusion extending from an inner surface of each of the brake pads, the brake pads located in the passage of the casing;

a driving disk having a plurality of pawls on a first surface thereof and a width of each of the pawls being less than a distance between two blocks of each of the brake pads, a hole defined through the driving disk and the distal end of the output shaft engaged with the hole of the driving disk, two opposite sides of the hole of the driving disk each having a hill portion at an intermediate portion thereof, a plurality of concavities defined in a second surface of the driving disk and each of which receives a spring a ball therein, and a cover plate mounted to the second surface of the driving disk and a plurality of holes defined through the cover plate, the number of the holes in the cover plate being two times of the number of the concavities in the driving disk, the balls engaged with half number of the holes, the cover plate having an aperture and two opposite sides of the aperture being in alignment with two opposite sides of the hole in the driving disk.

2. The device as claimed in claim 1, wherein the second surface of the driving disk has a plurality of recesses and each recess communicating with a notch located adjacent to the recess, the cover plate having a plurality of flanges which are inserted into the notches and slid into the recesses to connect the cover plate to the driving disk.

3. The device as claimed in claim 1, wherein the second surface of the driving disk has a plurality of stubs which extend through the cover plate and are pressed to be flat to secure the cover plate to the driving disk.

* * * * *